(12) United States Patent
Srivastav et al.

(10) Patent No.: US 12,334,280 B2
(45) Date of Patent: Jun. 17, 2025

(54) KEYBOARDS FOR ELECTRONIC DEVICES WITH KEYS HAVING INTEGRATED SPEAKERS

(71) Applicant: Intel Corporation, Santa Clara, CA (US)

(72) Inventors: Abhishek Srivastav, Bangalore (IN); Smit Kapila, Bangalore (IN); Prakash Kurma Raju, Bangalore (IN); Sumod Cherukkate, Bangalore (IN); Vijith Halestoph R, Bangalore (IN); Srikanth Potluri, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 187 days.

(21) Appl. No.: 18/185,460

(22) Filed: Mar. 17, 2023

(65) Prior Publication Data

US 2024/0312736 A1 Sep. 19, 2024

(51) Int. Cl.
*H01H 13/14* (2006.01)
*G06F 3/02* (2006.01)
*H01H 13/70* (2006.01)
*H04R 1/02* (2006.01)
*H04R 7/04* (2006.01)

(52) U.S. Cl.
CPC ........... *H01H 13/14* (2013.01); *G06F 3/0202* (2013.01); *H01H 13/70* (2013.01); *H04R 1/028* (2013.01); *H04R 7/04* (2013.01); *H01H 2239/048* (2013.01); *H04R 2499/15* (2013.01)

(58) Field of Classification Search
CPC .......... H01H 3/12; H01H 13/14; H01H 13/70; H01H 2239/048; H01H 3/00; H01H 13/00; H01H 13/50; H01H 13/52; H01H 13/72; H01H 2003/12; H01H 2013/00; H01H 2013/02; H01H 2013/04; H01H 2013/50; H01H 2013/52; G06F 3/0202; H04R 1/02; H04R 1/028; H04R 1/20; H04R 7/04; H04R 2499/15; G09G 5/00
USPC .................................. 345/156, 168; 200/5 A
See application file for complete search history.

(56) References Cited

U.S. PATENT DOCUMENTS

| | | | |
|---|---|---|---|
| 6,148,183 A * | 11/2000 | Higdon | H01H 13/807 455/575.1 |
| 7,531,764 B1 * | 5/2009 | Lev | H01H 13/83 200/310 |
| 11,113,494 B2 * | 9/2021 | Gupta | G06V 40/13 |
| 2003/0107579 A1 * | 6/2003 | Willis | G09G 5/395 345/545 |
| 2007/0102267 A1 * | 5/2007 | Schentrup | H01H 13/705 200/5 A |
| 2007/0120826 A1 * | 5/2007 | Burnette | H01H 13/70 345/168 |
| 2009/0128496 A1 * | 5/2009 | Huang | G06F 3/0202 345/170 |

(Continued)

FOREIGN PATENT DOCUMENTS

| | | | | |
|---|---|---|---|---|
| CN | 203675293 U | * | 6/2014 | H04R 1/24 |
| CN | 118672355 A | * | 9/2024 | G06F 3/0202 |

*Primary Examiner* — Anthony R Jimenez
(74) *Attorney, Agent, or Firm* — Hanley, Flight & Zimmerman, LLC

(57) ABSTRACT

Keyboards for electronic devices with keys having integrated speakers are disclosed herein. An example keyboard includes a key having a key cap and a speaker coupled to the key cap. The speaker is disposed in or at least partially covered by the key cap.

20 Claims, 7 Drawing Sheets

(56) References Cited

U.S. PATENT DOCUMENTS

2015/0199027 A1\* 7/2015 Matsuoka ............. H01H 13/70
200/341

\* cited by examiner

KEYBOARDS FOR ELECTRONIC DEVICES WITH KEYS HAVING INTEGRATED SPEAKERS

FIELD OF THE DISCLOSURE

This disclosure relates generally to keyboards for electronic devices and, more particularly, to keyboards with keys having integrated speakers.

BACKGROUND

Portable electronic devices, such as laptop computers, are known to have one or more speakers. The speakers are typically mounted in the housing or body of the device.

BRIEF DESCRIPTION OF THE DRAWINGS

FIG. 2A shows the example key is a first (unpressed) position.

Figure 1:
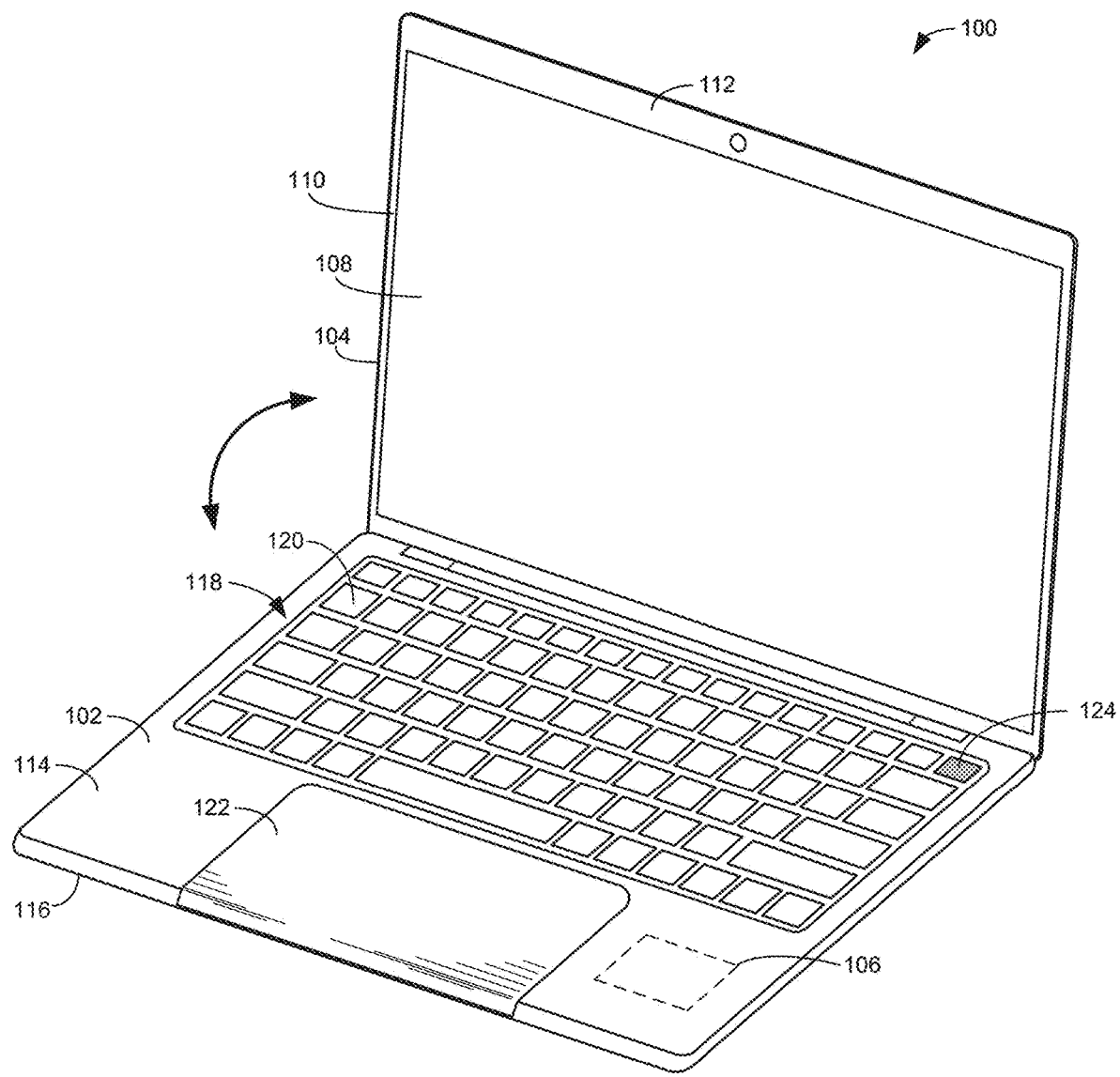
FIG. 1 is a perspective view of an example electronic device having an example keyboard in which example keys and example speakers disclosed herein can be implemented.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Electronic devices often include one or more speakers housed in a chassis or body of the electronic device. For example, laptop computers often include two speakers in the housing of the base of the laptop computer. User audio experience is a growing demand, and laptop manufacturers (as well as other electronic device manufacturers) desire to add more speakers to the base. However, the real estate inside of the base of a laptop computer is extremely valuable. There is often not enough space to integrate speakers without compromising other electronic components, which impacts user experience. For instance, most speakers are placed along the edges or corners of the base, which is the same critical locations used for antennas and input/output ports (e.g., USB ports, HDMI ports, etc.). This becomes more challenging as antenna count and type is also increasing (e.g., Wifi, WWAN, Aux, MIMO, etc.). Further, audio user experience is often compromised due to acoustic limitations of the chassis.

Disclosed herein are example keyboards for electronic devices (e.g., a laptop computer) that have speakers integrated into one or more of the keys of the keyboard. For example, the keyboard can include a key with a key cap and a speaker disposed below the key cap. In some examples, the speaker is coupled to and moves with the key cap when the key is pressed. In other examples, the speaker is fixed to the housing and the key cap moves up and down relative to the speaker. By integrating the speakers into and/or below the keys, this frees up valuable interior space in the housing of the electronic device for other electronic components (e.g., antennas, input/output ports, etc.). Further, incorporating the speakers into and/or below the keys enables the use of numerous speakers, which improves user audio experience for listening to music, playback, conference calls, etc. This also enables the use of larger speakers, based on the possible key size options. This also increases perceived loudness (e.g., up to 100 decibels A (dBA)) and frequency response (e.g., less than 200 Hertz (Hz)). Also, in some examples disclosed herein, the key cap includes a plurality of small ports or openings (e.g., microholes) to enable sound to penetrate through the key cap. The perceived sound is better than existing porting on the sides of the housing. In some examples, the key cap has an oleophobic coating, which prevents or repels oil from a person's finger and helps prevents the small openings from getting clogged after long usage.

Some example keys disclosed herein are designed to accommodate a speaker without impacting the overall Z (vertical) height of the key. As such, all of the keys (those including speakers and those not including speakers) of the keyboard can remain at the same relative height. Further, the example keys disclosed herein may provide the same tactile feeling as existing keys, so the integration of the speakers does not interfere with the existing user typing experience. Examples are disclosed herein in which the key has a larger stroke, such as those used on gaming computers, or a smaller stroke (e.g., a haptic feeling), such as those used on the thin/light computers.

The example keyboards and keys disclosed herein may also enable easier repair/replacement of the speakers. In particular, a speaker may be removed and repaired or replaced by removing one of the keys from the keyboard. This is easier than disassembling the entire base/housing of the electronic device to access the speakers, and even if having speaker protection algorithms.

FIG. 1 is a perspective view of an example electronic device 100 in which examples disclosed herein can be implemented. In the illustrated example, the electronic device 100 is implemented as laptop computer, referred to herein as the laptop computer 100. However, the examples disclosed herein can be implemented in connection with other types of electronic devices, such as tablets, phones, personal computers (PCs), etc.

In the illustrated example, the laptop computer 100 includes a base 102 and a lid 104 that are moveably coupled (e.g., hingedly coupled). The base 102 can also be referred to as a housing or chassis. The lid 104 can also be referred to as a top or cover. The base 102 and the lid 104 may together form a clamshell housing. In the illustrated example of FIG. 1, the base 102 and the lid 104 are rotatably or pivotably coupled along their edges The lid 104 may be rotated between an open position, as shown in FIG. 1, in which the lid 104 is angled relative to the base 102, and a closed position, in which the lid 104 is adjacent and/or engaged with a top cover 114 of the base 102.

In the illustrated example, the base 102 contains (e.g., houses) one or more electrical components 106 of the laptop computer 100. The electrical components 106 may include, for example, processor circuitry (e.g., a central processing unit (CPU), a graphics processing unit (GPU), processor core(s), etc.), one or more storage devices (e.g., solid state memory), one or more batteries, one or more cooling devices (e.g., fans), one or more antennas, and/or other hardware and/or circuitry.

As shown in FIG. 1, the laptop computer 100 includes a display 108 carried by the lid 104. The display 108 is disposed on (and may form part of) a front side 110 of the lid 104. The display 108 presents images in response to electrical signals from one or more of the electrical components 106. The display 108 may be located in a recess formed in the lid 104 and may be completely or partially surrounded by a bezel 112. The bezel 112 may or may not be flush with the display 108. In some examples, the base 102 can also include one or more displays.

The base 102 can be constructed of one or more panels or covers. For example, the base 102 has a top cover 114 and a bottom cover 116. The top cover 114 forms a top side of the base 102 and the bottom cover 116 forms a bottom side of the base 102. The top cover 114 can also be referred to as a C-cover, and the bottom cover 116 can also be referred to as a D-cover. In some examples the top and bottom covers 114, 116 can be constructed of aluminum, plastic, and/or any other material or combination of materials (e.g., stainless steel). In some examples, the top and bottom covers 114, 116 are separate covers that are coupled together (e.g., via threaded fasteners) and form a housing. In other examples, the top and bottom covers 114, 116 can be constructed as single cover or panel that forms a housing.

In the illustrated example of FIG. 1, the laptop computer 100 includes an example keyboard 118 carried by the base 102. In this example, the keyboard 118 is on (e.g., coupled to) the top cover 114 of the base 102. The keyboard 118 includes a plurality of keys 120 (one of which is referenced in FIG. 1). The keys 120 can be pressed by a user to enter information and/or commands into the laptop computer 100. The keys 120 can be arranged in any type of layout, such as QWERTY, QWERTZ, or AZERTY. When pressed, the keys 120 move relative to the base 102. The distance a key moves when pressed is referred to as stroke. The stroke may be a short stroke, such as used on haptic keyboards, or a long stroke, such as used on gaming keyboards. In the illustrated example, the laptop computer 100 also includes a trackpad 122 carried by the base 102 (e.g., on the top cover 114). In other examples, the laptop computer 100 may not include a trackpad.

Laptop computers often include one or more speakers that are disposed in the base 102. The speakers take up valuable space in the base 102 that could otherwise be used for other electronic components, such as antennas, input/output port circuitry, and/or memory. Disclosed herein are example keyboards with keys having integrated speakers. For example, the key labeled 124 (shaded grey) can include an integrated speaker. In some examples, multiple ones of the keys of the keyboard 118 have integrated speakers. The keys without speakers can be implemented by traditional keys. By integrating one or more speakers into the keys, more space is available in the base 102 for other electronic components. Further, integrating speakers into the keys enables the use of multiple speakers (e.g., two, three, four, five, etc.), which improves the user audio experience.

Figure 2A:
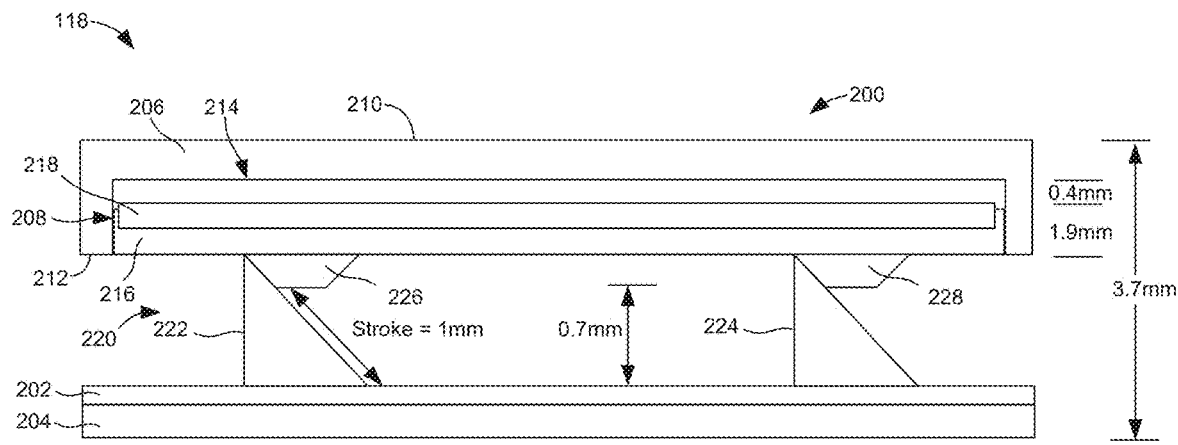
FIG. 2A is a side view of an example key including an example key cap and an example speaker that can be implemented on the example keyboard of FIG. 1.

FIG. 2A is a side view of an example key 200 with an integrated speaker that can be implemented on the example keyboard 118. One or more of the keys 120 on the keyboard 118 can be implemented or constructed as the example key 200. In the illustrated example, the keyboard 118 includes a touchplate 202 below the key 200. The touchplate 202 is mounted in the base 102 (FIG. 1). In some examples, the touchplate 202 is a capacitive touchplate. When the key 200 is pressed (e.g., moved downward in FIG. 2A), a portion of the key 200 contacts the touchplate 202, which senses the contact and registers the key press. In some examples, the keyboard 118 includes a backlight 204, which illuminates the keys. In some examples, the backlight 204 is disposed below the touchplate 202.

In the illustrated example, the key 200 includes an example key cap 206. The key cap 206 is the portion of the key 200 that is contacted by a user's finger. The key cap 206 may include indicia (e.g., "A", "shift", etc.) indicating the function or symbol the key 200 represents. In the illustrated example, the key 200 also includes an example speaker 208. The speaker 208 is disposed below the key cap 206. As such, the speaker 208 is disposed at least partially between the key cap 206 and the touchplate 202. Further speaker 208 is disposed at least partially between the key cap 206 and the bottom cover 116 (FIG. 1) of the base 102 (FIG. 1).

In this example, the speaker 208 is coupled to (e.g., carried by) the key cap 206. As such, the key cap 206 and the speaker 208 moveable together when the key 200 is pressed or returns to its original position. In some examples, the speaker 208 is disposed in or at least partially covered by the key cap 206. For example, as shown in FIG. 2A, the key cap 206 has a top side 210 and a bottom side 212 opposite the top side 210. The key cap 206 has a recess 214 (e.g., a cavity, a cut-out, etc.) defined or formed in the bottom side 212. In the illustrated example, the speaker 208 is disposed in the recess 214. In some examples, the key cap 206 entirely covers the speaker 208 such that the speaker 208 is not visible from a top view of the keyboard 118 (except for through the optional ports/openings disclosed in further detail herein). In some examples, the speaker 208 is coupled to the key cap 206 via an interference fit (sometimes referred to as a friction fit or press fit). In other examples, the key cap 206 and the speaker 208 can be coupled via other mechanical and/or chemical fastening techniques (e.g., an adhesive, a threaded fastener (e.g., a screw), etc.). In some examples, the bottom of the speaker 208 is even or aligned with the bottom side 212 of the key cap 206 surrounding the recess 214. In other examples, the speaker 208 can be disposed entirely within the key cap 206 or may extend outward from the key cap 206. In some examples, the key cap 206 entirely encloses or surrounds the speaker 208. For example, the key cap 206 can be constructed of two portions that couple together and form a housing around the speaker 208.

In the illustrated example, the speaker 208 includes a driver 216 and a diaphragm 218 (sometimes referred to as a cone). When activated, the driver 216 vibrates the diaphragm 218 to create air pressure waves, which equate to sound waves. In some examples, the driver 216 includes a permanent magnet (sometimes referred to as a core) and an electromagnet, where one of the permanent magnet or the electromagnet is movable relative to the other. In the illustrated example, the driver 216 is coupled to the key cap 206 (e.g., via interference fit, via an adhesive). In the orientation shown in FIG. 2A, the diaphragm 218 is disposed above or on top of the driver 216. As such, sound generated by the speaker 208 is projected generally upward in FIG. 2A. In the illustrated example, the diaphragm 218 is spaced from the bottom side 212 of the key cap 206. Therefore, a gap exists between the diaphragm 218 and the bottom side 212 of the key cap 206. This enables the diaphragm 218 to vibrate and create sound waves without contacting the key cap 206, which may otherwise cause damage to the speaker 208.

While some example dimensions are shown in FIG. 2A, other dimension may be selected. In some examples, the speaker 208 has a vertical height of 1.9 millimeters (mm) and the gap between the speaker 208 and the bottom side 212 of the key cap 206 is 0.4 mm. The speaker 208 and gap may be referred to as the speaker box, which is the vertical height added by the speaker 208. In some examples, the total vertical height of the key 200 and the keyboard 118 is 3.7 mm. The example key 200 and the section of the keyboard 118 has the same vertical height as other keys without speakers, as disclosed in further detail herein.

In this example, the keyboard 118 includes an example slider mechanism 220 to enable the key 200 to move up and down. This type arrangement provides for a larger key stroke, which is sometimes desired for keyboards on gaming computers and other types of uses. In this example, the slider mechanism 220 includes a first slider 222 and a second slider 224 between the key 200 and the touchplate 202. In this example, the first and second sliders 222, 224 are sloped or triangular shaped. In the illustrated example, the key 200 includes first and second guides 226, 228 that are engaged with and slide along the first and second sliders 222, 224, respectively. In this example, the first and second guides 226, 228 are coupled to an extend from a bottom of the speaker 208.

Figure 2B:
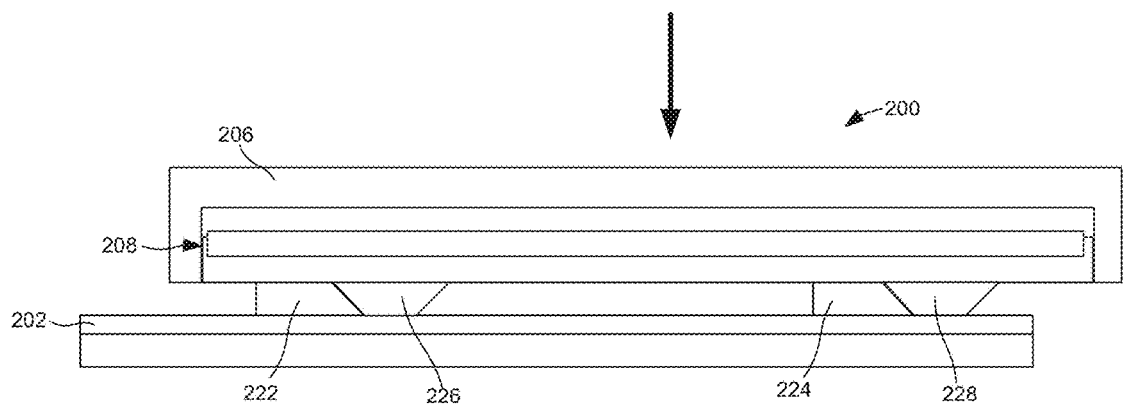
FIG. 2B shows the example key of FIG. 2A in a second (pressed) position.

When a user presses the key 200 downward, the key 200 slides downward and laterally along the first and second sliders 222, 224 and the first and second sliders 222, 224 compress or contract, as shown in the position in FIG. 2B. As shown in FIG. 2B, the first and second guides 226, 228 of the key 200 contact the touchplate 202. The touchplate 202 senses this contact and registers the key press. Additionally or alternatively, one or more other portions of the key cap 206 and/or the speaker 208 may make contact with the touchplate 202. The first and second sliders 222, 224 act as springs. In some examples, the first and second sliders 222, 224 include bellows.

Figure 3:
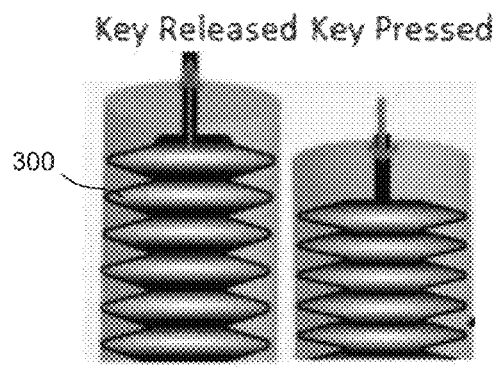
FIG. 3 shows an example bellows that can be implemented in an example slider mechanism of FIGS. 2A and 2B.

FIG. 3 illustrates an example bellows 300 that can be implemented in the first and second sliders 222, 224. The bellows 300 contracts when a compressive force is applied, and then rebounds or expands when the force is removed. As such, the bellows acts like a spring to help the key 200 regain its original position once the force is removed. This also provides a tactile experience during typing, which is similar to or the same as the other keys without speakers.

As shown in FIGS. 2A and 2B, when the key 200 is pressed, the key 200 moves along the sliders 222, 224 in an angled or diagonal direction (i.e., downwards and laterally). This enables the total stroke to be larger than the Z (vertical) distance that is travelled. For example, the guides 226, 228 may be separated from the touchplate 202 by about 0.7 mm. Therefore, the key 200 moves in the vertical direction about 0.7 mm. However, the key 200 travels a total distance of about 1 mm between the position FIG. 2A and the position in FIG. 2B because the key 200 moves in a diagonal direction along the first and second sliders 222, 224. Therefore, the key 200 may have the same stroke as the other keys on the keyboard 118. As such, the key 200 can be slightly thicker because of the addition of the speaker 208 while still providing the same tactile feeling during actuation as the other keys on the keyboard 118. In other examples, the key 200 and the slider mechanism 220 can be configured for a larger or smaller stroke.

Figure 4A:
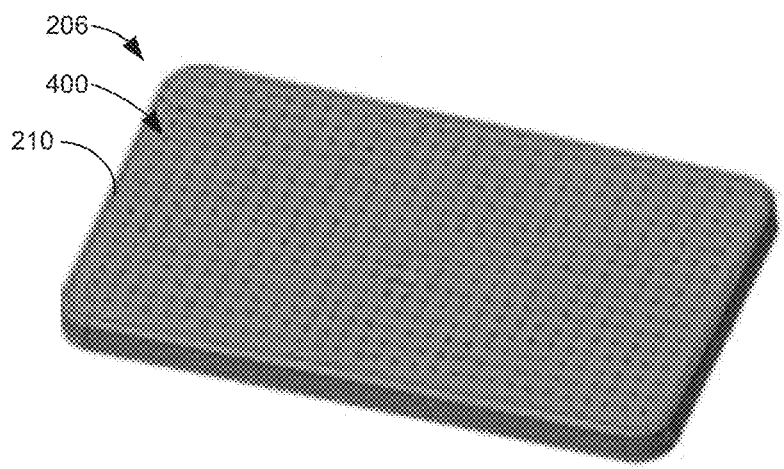
FIG. 4A is a perspective view of a top side of the example key cap of FIG. 2A.
Figure 4B:
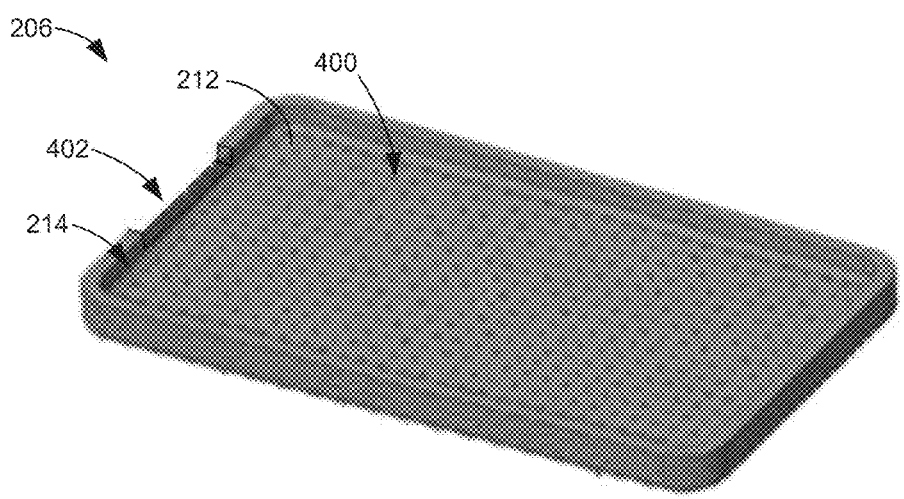
FIG. 4B is a perspective view of a bottom side of the example key cap of FIG. 2A.

FIGS. 4A and 4B are perspective views of the key cap 206. As disclosed above, the bottom side 212 of the key cap 206 has the recess 214, which accommodates at least a portion of the speaker 208. In some examples, the key cap 206 includes porting (e.g., openings) to enable sound waves to penetrate or pass through the key cap 206. For examples, as shown in FIGS. 4A and 4B, the key cap 206 includes a plurality of openings 400 (e.g., holes, channels) (one of which is referenced in FIGS. 4A and 4B) extending through the key cap 206 between the top side 210 and the bottom side 212. The openings 400 allow the air pressure waves (i.e., sound waves) to pass through the key cap 206, which improves the volume of the sound generated by the speaker 208. In some examples, the openings 400 may be relatively small (e.g., microholes). For example, in some instances, the openings 400 are about 0.1 mm (e.g., ±0.01 mm) in diameter. Even with these relatively small openings 400, the sound quality and perceived volume is close to or on par with standard size ports/openings (e.g., about 0.5 mm-1 mm). Therefore, there is little or no audio performance impact. However, in other examples, the openings 400 can have smaller or larger diameters. In the illustrated example, the openings 400 are arranged in a grid pattern and a spaced equidistant from each other. In other examples, the openings 400 can be arranged in other configurations and/or layouts.

In some examples, the key 200 includes an oleophobic coating on the key cap 206. The oleophobic coating prevents or repels oil. This helps to prevent or reduce the openings 400 from being blocked or clogged by oil and other residue on a person fingers.

In some examples, the key cap 206 is constructed of a relatively strong, rigid material. For example, the key cap 206 includes (e.g., is constructed of) a metal, such as steel (e.g., stainless steel). This enables the key cap 206 to be constructed relatively thin (to provide room for the speaker 208), while still providing sufficient rigidity to prevent the key cap 206 from being deformed inward and contacting the speaker 208 (which may cause damage to the speaker 208). In some examples, the key cap 206 is constructed of a material (e.g., steel) to ensure a deformity of less than 0.001 mm when pressed with a force of 5 Newtons (N) (500 grams (gm)). This ensures a large enough gap for when the key cap 206 is depressed and the diaphragm 218 is in its upper most position. In other examples, the key cap 206 can be constructed of other types of materials (e.g., aluminum, titanium). In some examples, the key cap 206 is constructed as a single unitary part or component (e.g., a monolithic structure). In other examples, the key cap 206 can be constructed of multiple parts or sections that are coupled together.

Figure 5:
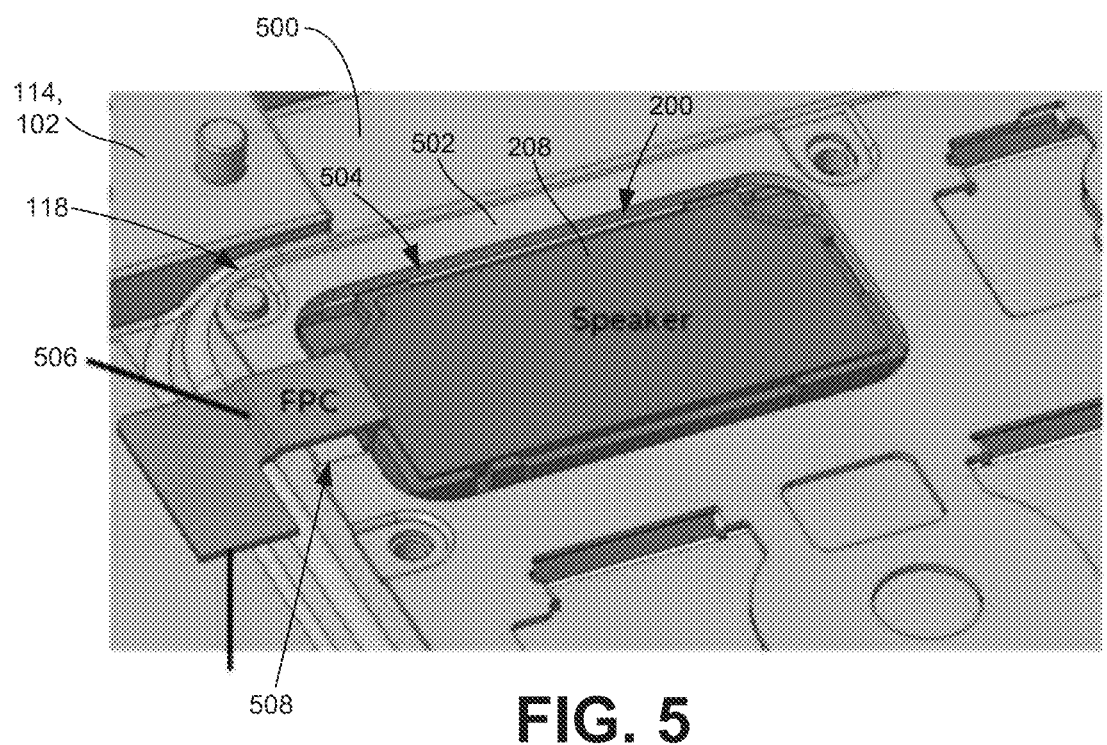
FIG. 5 shows an example electrical connection routing to the example speaker of the example key of FIGS. 2A and 2B on a bottom side of a top cover of the example electronic device.
Figure 6:
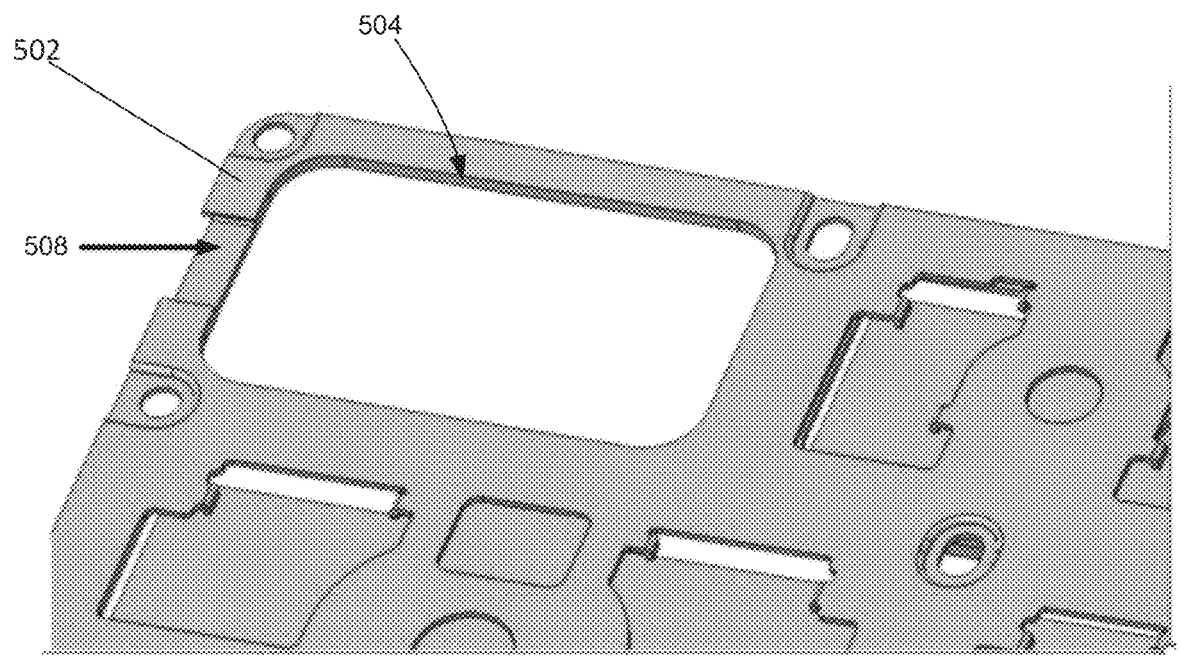
FIG. 6 shows an example back plate of the example keyboard in FIG. 5.

As shown in FIG. 4B, the bottom side 212 of key cap 206 has a notch 402. In some examples, the notch 402 enables an electrical connection to be made to the speaker 208 while being disposed in the key cap 206. For example, FIG. 5 shows a portion the keyboard 118 coupled to a bottom side 500 of the top cover 114 of the base 102. The touchplate 202 and the slider mechanism 220 have been removed for clarity. The keyboard 118 includes a back plate 502. The back plate 502 is coupled to the bottom side 500 of the top cover 114 (the C-cover). FIG. 6 is an isolated view of the back plate 502. As shown in FIGS. 5 and 6, the back plate 502 has an opening 504 for the key 200. This enables the key 200 to move up and down to contact the touchplate 202, which would be coupled to the back plate 502. As shown in FIG. 5, a flexible printed circuit (FPC) 506 is coupled to the speaker 208. The FPC 506 may be connected to processor circuitry in the laptop computer 100. This enables power signals to be routed to the speaker 208. The FPC 506 has slack to enable the FPC 506 to move up and down when the key 200 is moved. In the illustrated example, the back plate 502 has a groove 508. The FPC 506 passes through the groove 508, which helps to reduce the vertical height of the keyboard 118. Further, the FPC 506 also passes through the notch 402 (FIG. 4B) in the key cap 206 (FIG. 4B) to connect to the speaker 208.

Figure 7:
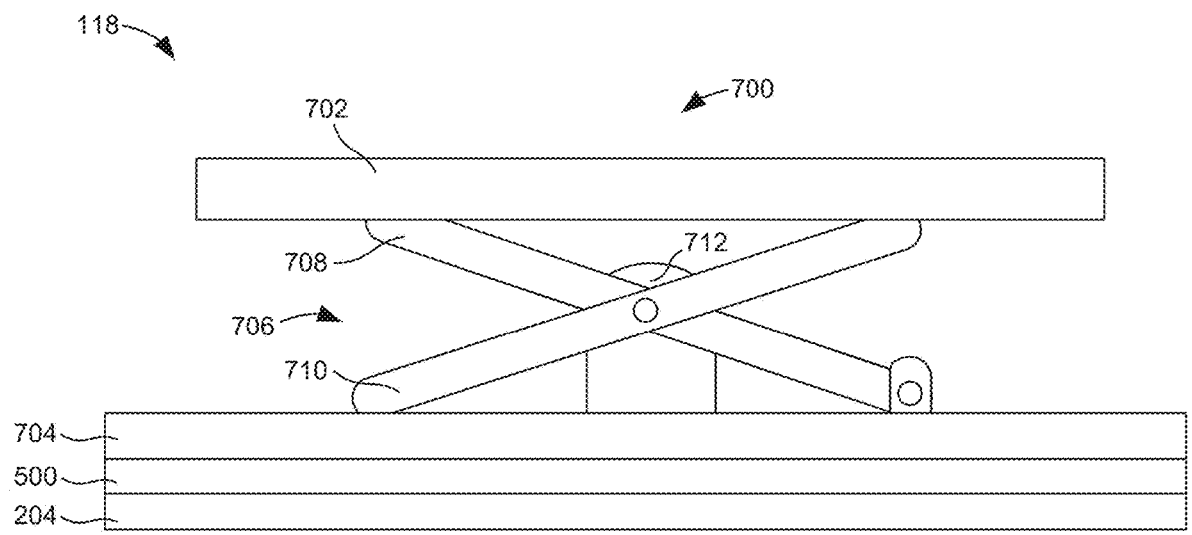
FIG. 7 is a side view of an example key with an example scissor mechanism that can be implemented on the example keyboard of FIG. 1.

In some examples, one or more of the other keys on the keyboard 118 may not include a speaker. In some examples, these other keys may utilize a scissor mechanism for enabling the key to move up and down. For example, FIG. 7 is a side view of an example key 700 that can be implemented on the example keyboard 118. The key 700 does not include a speaker. In the illustrated example, the key 700 includes a key cap 702. In the illustrated example, the keyboard 118 includes a membrane 704 on the back plate 502, which is on the backlight 204. The membrane 704 provides electrical connection when the key 700 is pressed. The keyboard 118 includes a scissor mechanism 706 below the key 700. In particular, the scissor mechanism 706 is between the key 700 and the membrane 704. The scissor mechanism 706 includes a first arm 708 and a second arm 710 that are pivotably coupled. The first and second arms 708, 710 are slidably along a bottom of the key cap 702. The first arm 708 is also pivotably coupled to the membrane 704 and/or the back plate 502. The second arm 710 is slidable along the membrane 704. In the illustrated example, the keyboard 118 includes a switch 712 below the key cap 702. When the key 700 is pressed downward, the first and second arms 708, 710 fold together, like a pair of scissors. Also, when the key 700 is pressed, the key cap 702 engages the switch 712, which registers the key press.

Table 1 below shows example Z (vertical) dimensions of the components in the example key 200 and the example key 700.

TABLE 1

|  | Key 400 with scissor mechanism | Key 200 (with integrated speaker) and slider mechanism |
| --- | --- | --- |
| Key Cap | 0.5 mm | 0.4 mm |
| Speaker | None | 2.3 mm (including speaker and gap between speaker and key cap) |
| Scissor/Slider Mechanism | 2.5 mm | 0.7 mm |
| Membrane | 0.3 mm | None |
| Back Plate | 0.2 mm | 0.1 mm (touchplate) |
| Backlight Module | 0.2 mm | 0.2 mm |
| Total Z height | 3.7 mm | 3.7 mm |

As shown above, the total Z height of the key 200 (with a speaker) is the same as the total Z height of the key 700 (without a speaker). As such, using the example key 200 with the integrated speaker 208 does not affect the total Z (vertical) height. Therefore, all of the keys of the keyboard 118 can maintain the same Z height across the keyboard 118. Further, the key 200 has the same or about the same stroke distance as the key 700. For example, the key 700 may have a stroke distance of about 0.7 mm. The key 200 has a vertical stroke distance of 0.5 mm. However, because the key 200 travels at an angle, the total stroke distance is about 0.7 mm. Therefore, the stroke distance of the key 200 is perceived to be the same as the key 700. It is understood that the dimensions in Table 1 are example values, and the Z (vertical) dimensions of any of the components can be smaller or larger.

In some examples, each of the keys of the keyboard 118 that include a speaker utilize a slider mechanism, as shown in FIGS. 2A and 2B, and each of the keys that do not include a speaker utilize a scissor mechanism, as shown in FIG. 7. As such, the keyboard 118 may be considered a hybrid keyboard for having two different types of key mechanisms.

In some examples, multiple ones of the keys can have integrated speakers similar to the key 200. For example, the keyboard 118 may have two, three, four, etc. keys with speakers, while the remaining keys do not include speakers. The speakers can be integrated into certain keys so as to be arranged to provide improved audio experience. For example, speakers can be integrated into the four keys that form the corners of the keyboard 118, thereby creating a surround sound effect. In some examples, different kinds of speakers can be integrated into different ones of the keys. For example, one of the keys may include a tweeter speaker for high frequencies and another one of the keys may include a bass speaker for lower frequencies. In some examples, speakers are integrated into the keys that are used the least amount of time. For example, speakers can be integrated into a function key, a home key, etc., so the audio vibration has a small (e.g., minimal) impact on the user experience. In some examples, speakers can be integrated into the larger keys, such as the "Shift" key. This enables the use of larger speakers, which can produce sound quality on par with or better than known speakers integrated into the base housing. The example keys with integrated speakers are also beneficial for smaller speakers, such as tweeters, and they only need a small back volume in the range of 0.1 cc to 0.2 cc. With top porting (e.g., the openings 400), the keys with tweeters speakers produce between performance than known electronic devices with side porting.

While in the example of FIGS. 2A and 2B the key 200 has a relatively large vertical height (e.g., 3.7 mm) and stroke, in other examples, the keyboard 118 may be configured to have a smaller vertical height and/or smaller (or no) stroke, sometime referred to as a haptic touch keyboard. This is beneficial for use on smaller, thinner electronic devices, such as ultra-thin laptop computers. Example keys with speakers can be used in these types of keyboards.

Figure 8:
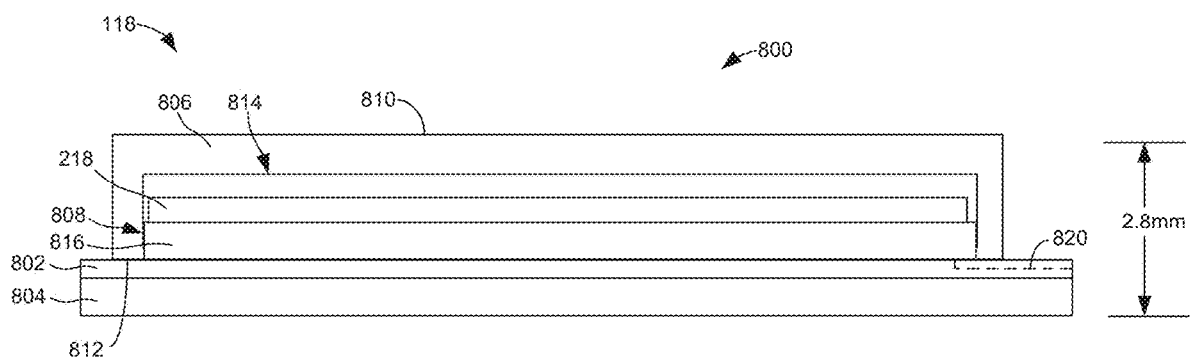
FIG. 8 shows another example key including an example key cap and an example speaker that can be implemented on the example keyboard of FIG. 1.

FIG. 8 is a cross-sectional view of an example key 800 with a speaker implemented on the example keyboard 118. In the illustrated example, the keyboard 118 includes a touchplate 802. The touchplate 802 is mounted in the base 102 (FIG. 1). In some examples, the touchplate 802 is a capacitive touchplate. In this example, the key 800 is mounted on or coupled to the touchplate 802. When the key 800 is pressed, the touchplate 802 senses the pressure and registers the key press. Therefore, in this example, the key 800 moves very little (e.g., 0.1 mm), if at all. In some examples, the keyboard 118 includes a backlight 804, which illuminates the keys. In some examples, the backlight 804 is disposed below the touchplate 802.

In the illustrated example, the key 800 includes an example key cap 806 and a example speaker 808 coupled to the key cap 806. The key cap 806 has a top side 810, a bottom side 812, and a recess 814 formed in the bottom side 812. The speaker 808 is disposed in the recess 814. In some examples, the speaker 808 is coupled to the key cap 806 via an interference fit. In other examples, the key cap 806 and the speaker 808 can be coupled via other mechanical and/or chemical fastening techniques (e.g., an adhesive, a threaded fastener (e.g., a screw), etc.). The speaker 808 has a speaker driver 816 and a diaphragm 818. The diaphragm 818 is spaced from the bottom side 812 of the key cap 806. The key cap 806 may be similar to the key cap 206 and include a plurality of openings to enable sound waves to penetrate through the key cap 806. In some examples the key cap 806 has an oleophobic coating. In some examples, the key cap 806 is constructed of metal, such as steel. This enables the key cap 806 to be constructed relatively thin while still provide structural support to prevent the key cap 806 from deforming and damaging the speaker 808. In the illustrated example, the keyboard 118 has an electrical connection 820 (e.g., a wire, a trace) extending along or through the touchplate 802 that connects to the speaker 808. In other examples, an FBC can be routed through a notch in the key cap 806 similar to the example shown in FIGS. 5 and 6.

In some examples, one or more of the keys on the keyboard 118 may include speakers as shown in FIG. 8, and other the keys without speakers can include a scissor mechanism, similar to FIG. 7. In some examples, the scissor mechanism is sized smaller for less vertical height. Table 2 below shows example Z (vertical) dimensions of the components in the example key 800 and the example key 700.

TABLE 2

|  | Key 700 with scissor mechanism | Key 800 (with integrated speaker) |
| --- | --- | --- |
| Key Cap | 0.5 mm | 0.3 mm |
| Speaker | None | 2.2 mm (including speaker and gap between speaker and key cap) |
| Scissor Mechanism | 1.6 mm | None |
| Membrane | 0.3 mm | None |
| Back Plate | 0.2 mm | 0.1 mm (touchplate) |
| Backlight Module | 0.2 mm | 0.2 mm |
| Total Z height | 2.8 mm | 2.8 mm |

As shown above, the total Z (vertical) height of the key 800 is the same as the total Z (vertical) height of the key 700. As such, using the example key 800 with the integrated speaker 808 does not affect the total Z (vertical) height of the keyboard 118. Therefore, all of the keys of the keyboard 118 can maintain the same Z height across the keyboard 118. In this example, however, the key 800 has less stroke distance than the other keys with the scissor mechanism. In particular, the key 800 uses a touchplate for haptic touch, while the other keys without speakers can utilize a scissor mechanism. It is understood that the dimensions in Table 2 are example values, and the Z (vertical) dimensions of any of the components can be smaller or larger.

Figure 9:
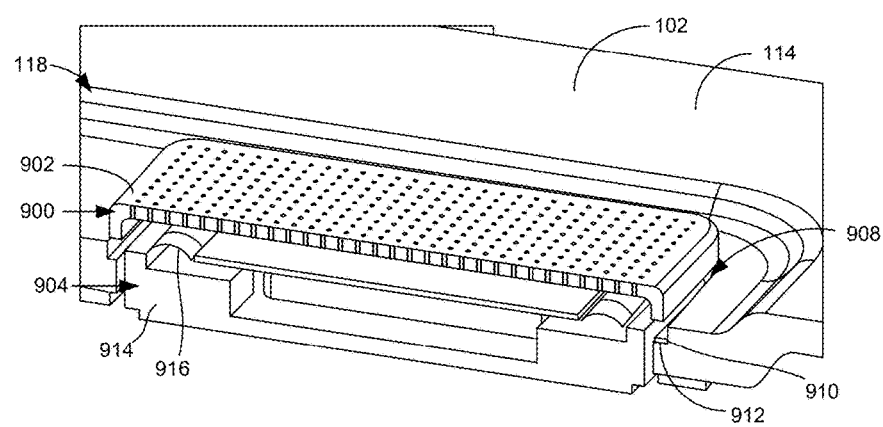
FIG. 9 is a perspective cross-sectional view of another example key and an example speaker that can be implemented on the example keyboard of FIG. 1.
Figure 10:
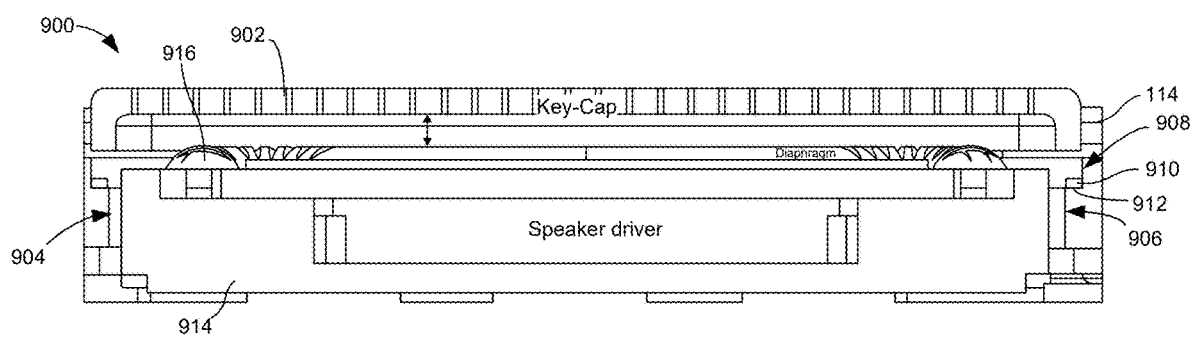
FIG. 10 is a side cross-sectional view of the example key and the example speaker of FIG. 9.

In some examples, a keyboard can include a speaker that remains fixed while the key cap moves up and down relative to the speaker. FIGS. 9 and 10 show an example key 900 that be implemented on the keyboard 118. The key 900 includes an example key cap 902. In the illustrated example, the keyboard 118 includes a speaker 904 below the key cap 902. In the illustrated example, the top cover 114 (the C-cover) has an opening 906 for the key 900. In the illustrated example, the speaker 904 is disposed in the opening 906. In this example, the speaker 904 remains fixed relative to the base 102, and the key cap 902 is moveable up and down over or relative to the speaker 904. In some examples, the speaker 904 is coupled to the top cover 114 (e.g., via an adhesive, via one or more fasteners). Additionally or alternatively, the speaker 904 can be coupled to a back plate (e.g., the back plate 502) that is coupled to a bottom side of the top cover 114. In some examples, an FBC is connected to the speaker 904, similar to the example shown in FIGS. 5 and 6.

In the illustrated example of FIGS. 9 and 10, the top cover 114 has a recess 908 to accommodate the key cap 902 when pressed down. In the illustrated example, the keyboard 118 includes a sensor 910 (e.g., a touchplate) on a shoulder 912 in the recess 908. When the key cap 902 is pressed down, the key cap 902 engages the sensor 910, which detects ad registers the key press. In other examples, other types of mechanisms can be used to detect a key stroke. In some examples, the keyboard 118 includes a slider or scissor mechanism to return the key cap 902 to its original position.

In this example, the key cap 902 is substantially the same as the key cap 206 disclosed above. Therefore, any of the example aspects disclosed in connection with the key cap 902 can likewise apply to the key cap 902.

As shown in FIGS. 9 and 10, the speaker 904 includes a speaker driver 914 and a diaphragm 916. The diaphragm 916 is spaced from a bottom side of the key cap 902 such that the diaphragm 916 does not engage the key cap 902 during use. In some examples, the diaphragm 916 is spaced from the key cap 902 by 0.7 mm. In other examples, the gap may be larger or smaller.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, apparatus, and articles of manufacture have been disclosed that enable a speaker to be integrated into or below a key on a keyboard of an electronic device. This frees up space in the housing of the electronic device for other electronic components, such as antennas, input/output port circuitry, and/or memory. Further, this enables the use of multiple speakers, which improves audio output of the electronic device. Also, the examples speakers can be easily accessed for repair and/or replacement, thereby reducing costs associated with fixing speakers. Some examples keys with speakers may use an alternative slider mechanism that provides the same tactical experience as other standard keys but with a lower Z (vertical) height movement.

Examples and combinations of examples disclosed herein include the following:

Example 1 is a keyboard for an electronic device. The keyboard comprises a key including a key cap and a speaker coupled to the key cap. The speaker is disposed in or at least partially covered by the key cap.

Example 2 includes the keyboard of Example 1, wherein the key cap has a top side and a bottom side opposite the top side. A recess or cavity is formed in the bottom side. The speaker is disposed in the recess or cavity.

Example 3 includes the keyboard of Examples 1 or 2, wherein the speaker includes a diaphragm. The diaphragm is spaced from a bottom side of the key cap.

Example 4 includes the keyboard of any of Examples 1-3, wherein the key cap has openings to enable sound waves to penetrate through the key cap.

Example 5 includes the keyboard of Example 4, wherein the openings have a diameter of about 0.1 mm.

Example 6 includes the keyboard of any of Examples 1-5, further including an oleophobic coating on the key cap.

Example 7 includes the keyboard of any of Examples 1-6, wherein the key cap includes steel.

Example 8 includes the keyboard of any of Examples 1-7, further including a touchplate. The speaker disposed between the key cap and the touchplate.

Example 9 includes the keyboard of Example 8, wherein the key contacts the touchplate when the key is moved downward.

Example 10 includes the keyboard of Example 8, wherein the key is coupled to the touchplate.

Example 11 includes the keyboard of any of Examples 1-10, wherein the key is a first key, the key cap is a first key cap, and the speaker is a first speaker. The keyboard further includes a second key with a second key cap and a second speaker coupled to the second key cap.

Example 12 includes the keyboard of any of Examples 1-11, wherein the key is a first key. The keyboard further includes a second key, the second key not including a speaker.

Example 13 is an electronic device including a base having a top cover and a bottom cover and a keyboard on the top cover of the base. The keyboard includes a key cap and a speaker disposed between the key cap and the bottom cover.

Example 14 includes the electronic device of Example 13, wherein the speaker and the key cap are moveable together when the key is pressed.

Example 15 includes the electronic device of Examples 13 or 14, wherein the speaker is coupled to the base. The key cap is moveable relative to the speaker.

Example 16 includes the electronic device of any of Examples 13-15, wherein the key cap has openings to enable sound waves to penetrate through the key cap.

Example 17 includes the electronic device of any of Examples 13-16, wherein the electronic device is a laptop computer.

Example 18 is a key for a keyboard on an electronic device. The key comprises a key cap having a top side and a bottom side opposite the top side. A recess or cavity is formed in the bottom side of the key cap. The key also includes a speaker disposed in the recess or cavity.

Example 19 includes the key of Example 18, wherein the speaker is coupled to the key cap via interference fit.

Example 20 includes the key of Examples 18 or 19, wherein the speaker has a diaphragm. The diaphragm is spaced from the bottom side of the key cap.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A keyboard for an electronic device, the keyboard comprising:
    a key including:
        a key cap having a top side and a bottom side opposite the top side, the key cap having openings extending through the key cap between the top side and the bottom side to enable sound waves to penetrate through the key cap;
        a speaker at least one of in or at least partially covered by the key cap; and
    an electrical connection coupled to the speaker, the electrical connection extending through a notch in the key cap.

2. The keyboard of claim 1, wherein the key cap has a recess or cavity in the bottom side, and the speaker is in the recess or cavity.

3. The keyboard of claim 1, wherein the speaker includes a diaphragm, the diaphragm spaced from the bottom side of the key cap.

4. The keyboard of claim 1, wherein the openings respectively have a diameter of about 0.1 mm.

5. The keyboard of claim 1, including an oleophobic coating on the key cap.

6. The keyboard of claim 1, wherein the key cap includes steel.

7. The keyboard of claim 1, wherein the key is a first key, the key cap is a first key cap, and the speaker is a first speaker, the keyboard including a second key with a second key cap and a second speaker associated with the second key cap.

8. The keyboard of claim 1, wherein the key is a first key, the keyboard including a second key and a scissor mechanism below the second key.

9. The keyboard of claim 1, including a touchplate, the speaker between the key cap and the touchplate.

10. The keyboard of claim 9, wherein the key contacts the touchplate when the key is moved downward.

11. The keyboard of claim 9, wherein the key is coupled to the touchplate.

12. An electronic device comprising:
    a base having a top cover and a bottom cover; and
    a keyboard on the top cover of the base, the keyboard including:
        a key cap;
        a speaker carried by the base, the speaker between the key cap and the bottom cover such that the speaker is at least partially covered by the key cap, the key cap moveable relative to the speaker; and an electrical connection coupled to the speaker, the key cap having a notch to receive the electrical connection.

13. The electronic device of claim 12, wherein the key cap comprises openings to enable sound waves to penetrate through the key cap.

14. The electronic device of claim 12, wherein the electronic device is a laptop computer.

15. The electronic device of claim 12, wherein the key cap has a top side, a bottom side opposite the top side, and openings extending through the key cap between the top side and the bottom side to enable sound waves to penetrate through the key cap.

16. A key for a keyboard on an electronic device, the key comprising:
   a key cap having a top side and a bottom side opposite the top side, a recess or cavity formed in the bottom side of the key cap, openings extending through the key cap between the top side and the bottom side to enable sound waves to penetrate through the key cap; and
   a speaker in the recess or cavity, the bottom side of the key cap having a notch to accommodate an electrical connection coupled to the speaker.

17. The key of claim 16, wherein the speaker is coupled to the key cap via interference fit.

18. The key of claim 16, wherein the speaker has a diaphragm, the diaphragm spaced from the bottom side of the key cap.

19. The key of claim 16, including an oleophobic coating on the key cap.

20. The key of claim 16, wherein each of the openings has a diameter of about 0.1 mm.

* * * * *